United States Patent Office 3,485,848
Patented Dec. 23, 1969

3,485,848
6β-ALKOXY-10β-CARBOXYL-3α,5-CYCLOSTEROIDS
Katsumi Tanabe, Ryozo Hayashi, Yasuhiro Morisawa, Teruo Hashimoto, Tadamasa Nakazawa, and Rinji Takasaki, Tokyo, Japan; said Tanabe, said Hayashi, said Morisawa, said Hashimoto, and said Nakazawa assignors to Sankyo Company Limited, Tokyo, Japan
No Drawing. Continuation-in-part of application Ser. No. 545,306, Apr. 26, 1966. This application July 7, 1966, Ser. No. 563,353
Claims priority, application Japan, July 19, 1965, 40/43,526
Int. Cl. C07c *169/24, 169/64, 167/22*
U.S. Cl. 260—397.1              9 Claims

ABSTRACT OF THE DISCLOSURE

Novel 6β-alkoxy-10β-carboxyl-3α,5-cyclosteroids which are useful as intermediates for the synthesis of various 19-norsteroids especially 19-nor-$\Delta^4$-3-ketosteroids. The latter are widely employed for medical purposes, for instance, as anabolic agents or oral contraceptives.

SUMMARY OF THE INVENTION

This is a continuation-in-part of our application Ser. No. 545,306 filed Apr. 26, 1966, now Patent No. 3,371,088.

This invention relates to novel 3α,5-cyclosteroids and a process for preparing the same. More particularly, this invention relates to novel 6β-alkoxy-10β-carboxyl-3α,5-cyclosteroids and a novel process for the preparation thereof from 6β-alkoxy-10β-hydroxymethyl-3α,5-cyclosteroids. Still more particularly, this invention is concerned with a novel 6β-alkoxy-10β-carboxyl-3α,5-cyclosteroid having the partial structure, with which only steroidal rings A and B are concerned, of the formula

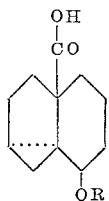

(I)

wherein R is a lower alkyl group, for example, methyl, ethyl, n-propyl, i-propyl and the like, and also with a novel process for the preparation of new steroid of the partial structure of the above-indicated Formula I from a 6β-alkoxy-10β-hydroxymethyl-3α,5 - cyclosteroid having the partial structure, with which only steroidal rings A and B are concerned, of the formula

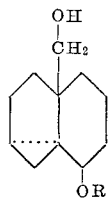

(II)

wherein R is as defined above.

The steroids having the partial structure of the above-indicated Formula I are novel compounds unknown in the prior art and useful as valuable intermediates for the synthesis of various 19-norsteroids especially 19-nor-$\Delta^4$-3-ketosteroids, which are widely employed for medical purposes, for instance, as an anabolic agent or an oral contraceptive.

There has appeared a great number of those methods for the production of 19-nor-$\Delta^4$-3-ketosteroids. Among these known methods, there may be commonly considered satisfactory such methods as those that appeared in Experientia 18, pages 464–466 (1962), and Chemical & Engineering News (Sept. 10, 1962), pages 64–65. Such known preferred methods, however, still have some serious problems to be improved or overcome, such as those concerning with the overall yield of the desired steroid and with many steps involved.

Although numerous attempts have been made in the art in order to find out a commercially available process for the production of 19-nor-$\Delta^4$-3-ketosteroids, a satisfactory success has not been attained, and, therefore, such advantageous process has been earnestly desired in the art.

In the copending U.S. patent application No. 545,306 filed on Apr. 26, 1966, by K. Tanabe et al., there have been disclosed and claimed a novel method for the production of 19-nor-$\Delta^4$-3-ketosteroids, consisting of heating 6β(or 6α)-alkoxy-10β-carboxyl - 3α,5 - cyclosteroids together with an alkylsulfoxide. Accordingly, when the present process is utilized for the production of 19-nor-$\Delta^4$-3-ketosteroids, in combination with the process in the above-specified copending patent application, the desired 19-norsteroid may be far more advantageously obtained, specifically in higher yield with fewer steps, as compared with the aforesaid prior processes.

In accordance with this invention, the present 6β-alkoxy-10β-carboxyl-3α,5-cyclosteroids having the partial structure of the above indicated Formula I can be prepared by a novel process which comprises treating the 6β-alkoxy-10β-hydroxymethyl - 3α,5 - cyclosteroid having the partial structure of the above-indicated Formula II for example, an oxidizing agent containing chromium trioxide ($CrO_3$) in a sufficient amount to oxidize a hydroxymethyl group (—$CH_2OH$) into a carboxyl group (—COOH)

Therefore, it is an object of this invention to provide a novel 6β-alkoxy-10β-carboxyl-3α,5-cyclosteroid having the partial structure of the above-indicated Formula I which may be satisfactorily employed as an intermediate for the synthesis of valuable 19-norsteroids, especially those disclosed and claimed in the aforesaid copending patent application. Another object of this invention is to provide a novel process for the production of a novel steroid having the partial structure of the above-indicated Formula I. These and other objects of this invention will become apparent from the following detailed description.

In carrying out the process of this invention, the starting steroid having the above-indicated Formula II is dissolved in a water-miscible inert organic solvent such as acetone, dioxane, tetrahydrofuran and the like, and then the resulting solution is treated with an oxidizing agent, for example, an oxidizing agent containing chromium trioxide in a sufficient amount to oxidize a hydroxymethyl group into a carboxyl group.

As the oxidizing agents which may be employed in the present process, preferably are those oxidizing agents containing chromium trioxide as a component thereof.

Preferred examples of such chromium trioxide-containing oxidizing agent include the Jones reagent (preferably prepared by dissolving 26.72 g. of chromium trioxide in 23 ml. of conc. sulfuric acid and then making up with water to 100 ml.; J. Chem. Soc., 2555 (1953), and a solution of chromium trioxide in acetice acid containing a small amount of mineral acid such as sulfuric acid. For the present purpose, these oxidizing agents may usually and conveniently be employed in a theoretical amount required to oxidize a hydroxymethyl group into a carboxyl group, that is, in a calculated amount sufficient to produce two moles of active oxygen atoms per one mole of a starting steroid, but generally it is preferable to employ the oxidizing agent in a slightly larger amount. The reaction temperature may be normally within a range of from about $-20°$ C. to $+10°$ C. The reaction period will largely depend upon the reaction temperature employed and, usually, the reaction is completed for about 30 minutes to 6 hours.

After completion of the reaction, the desired product may be recovered from the reaction mixture by a conventional method. When, for example, the Jones reagent is employed as an oxidizing agent, the excess oxidizing agent is decomposed by addition of alcohol to the reaction mixture, alkali added in a sufficient amount to neutralize the mineral acid contained in the oxidizing agent employed, the resulting mixture concentrated under a reduced pressure and then the concentrate is made acidic and if desired water is added thereto. The resulting mixture is then extracted with water-immiscible organic solvent such as ethyl acetate, the extract washed with water, dried and the solvent is distilled off to obtain the desired product which may be further purified by recrystallization from a suitable organic solvent.

The starting steroids having the partial structure of the above-indicated Formula II to be employed in the present process may be easily obtained from the reaction of a $6\beta,19$-oxido-$3\alpha,5$-cyclosteroid (K. Tanabe et al., French Patent 1,353,691) with a lower alcohol in the presence of, for example, a mineral acid, as disclosed in French Patent 1,397,128 by K. Tanabe et al.

The starting steroid can be selected from the group consisting of $3\alpha,5$-cyclosteroids having the above-indicated partial structure of andostane, pregnane, cholane, spirostane and cholestane series; there may be further present, for example, a keto group, a ketalized oxo group, an enolated oxo group, a protected hydroxy group, an alkyl group, an alkenyl group, an alkynyl group, a halogenoalkynyl group, a halogen atom or a carboxyl group at, for example, $C_{11}$, $C_{12}$, $C_{14}$, $C_{15}$, $C_{16}$, $C_{17}$, $C_{18}$ and/or $C_{21}$. There may be more further other groups in the molecule of the starting steroid which will not adversely interfere with the reaction, such as a double bond between $C_9$ and $C_{11}$ or $C_{16}$ and $C_{17}$, oxido group

and the like.

Representatives of starting steroids are illustratively given hereinafter. However, there may be employed other starting steroids that will be included within the scope of the starting steroids defined with the appended claim.

(A) $3\alpha,5$-CYCLOSTEROIDS OF THE ANDROSTANE SERIES $6\beta$-methoxy-19-hydroxy-$3\alpha,5$-cyclo-$5\alpha$-androstane-17-one and the 17-ketal derivatives thereof and the corresponding $6\beta$-ethoxy and -propoxy derivatives;

$6\beta$-methoxy-$17\beta$,19-dihydroxy-$3\alpha,5$-cyclo - $5\alpha$-androstane and the 17-esters and -ethers thereof, for example, the corresponding 17-acetate-phenylpropionate and -adamantoate;

The $17\alpha$-alkyl, -alkenyl, -alkynyl and -halogeno-alkynyl derivatives of $6\beta$-methoxy-$17\beta$,19-dihydroxy-$3\alpha,5$-cyclo-$5\alpha$-androstane 17-esters and -ethers thereof, for example, the corresponding $17\alpha$-methyl, -vinyl, -ethynyl, -chloroethynyl and -propynyl derivatives.

(B) $3\alpha,5$-CYCLOSTEROIDS OF THE PREGNANE SERIES $6\beta$-methoxy-19-hydroxy-$3\alpha,5$-cyclo-$5\alpha$-pregnan-20-one and the corresponding $6\beta$-ethoxy and propoxy derivatives;

$6\beta$ - methoxy-19,20-dihydroxy-$3\alpha,5$-cyclo-$5\alpha$-pregnane 20-esters and ethers;

$6\beta$-methoxy-$17\beta$,19-dihydroxy-$3\alpha,5$-cyclo-$5\alpha$-pregnane 17-esters and ethers.

(C) $3\alpha,5$-CYCLOSTEROIDS OF THE CHOLESTANE SERIES $6\beta$-methoxy-19-hydroxy-$3\alpha,5$-cyclo-19-nor-$5\alpha$-cholestane and the corresponding $6\beta$-ethoxy and -propoxy derivatives.

(D) $3\alpha,5$-CYCLOSTEROIDS OF THE CHOLANE SERIES $6\beta$-methoxy-19-hydroxy-$3\alpha,5$-cyclo-19-nor-$5\alpha$-cholane and the corresponding $6\beta$-ethoxy and -propoxy derivatives.

(E) $3\alpha,5$-CYCLOSTEROIDS OF THE SPIROSTANE SERIES $6\beta$-methoxy-19-hydroxy-$3\alpha,5$-cyclo-19-nor-$5\alpha$-spirostane and the corresponding $6\beta$-ethoxy and -propoxy derivatives.

The following examples serve to illustrate this invention, but are not construed to limit the scope thereof.

EXAMPLE 1

Preparation of $6\beta$-methoxy-$3\alpha,5$-cyclo-$5\alpha$-estran-17-one $10\beta$-carboxylic acid To a solution of 2.00 g. of $6\beta$-methoxy-19-hydroxy-$3\alpha,5$-cyclo-$5\alpha$-androstan-17-one in 120 ml. of acetone was added dropwise 4.07 ml. of the Jones reagent (prepared by dissolving 26.72 g. of chromium trioxide in 23 ml. of conc. sulfuric acid and then making up with water to 100 ml.) with stirring under nitrogen atmosphere at $-5°$ C. Stirring was continued under the same condition as set forth above for additional 5 hours. After completion of the reaction, the excess reagent was decomposed by addition of isopropanol and then the reaction mixture made alkaline with 3% aqueous sodium bicarbonate and concentrated below $40°$ C. under reduced pressure.

The concentrate was made acidic with acetic acid and the acidic mixture extracted several times with ethyl acetate. The combined extracts were washed with water and dried over anhydrous sodium sulfate.

After removal of the solvent by distillation under reduced pressure, recrystallization of the residue from ethyl acetate gave 1.845 g. of the desired product, melting at $193°$ C. Yield: 88.2% (on the theoretical amount).

Analysis.—Calculated for $C_{20}H_{28}O_4$: C, 72.26; H, 8.49. Found: C, 71.92; H, 8.54.

EXAMPLE 2

Preparation of $6\beta$-methoxy-$17\alpha$-ethyl-$17\beta$-hydroxy-$3\alpha,5$-cyclo-$5\alpha$-estrane $10\beta$-carboxylic acid To a solution of 0.500 g. of $6\beta$-methoxy-$17\alpha$-ethyl-$17\beta$, 19-dihydroxy-$3\alpha,5$-cyclo-$5\alpha$-androstane in 30 ml. of acetone was added dropwise 1.2 ml. of the Jones reagent at $-5°$ C. with stirring under nitrogen atmosphere. Stirring was continued under the same condition as set forth above for additional 5 hours. After completion of the reaction, the excess reagent was decomposed by addition of isopropanol, the reaction mixture was made alkaline with 3% aqueous sodium bicarbonate and concentrated below $40°$ C. under reduced pressure. The concentrate was then made acidic with acetic acid and the acidic mixture extracted several times with ethyl acetate. The combined extracts were washed with water and dried over anhydrous sodium sulfate. After removal of the solvent by distillation under reduced pressure, recrystallization of the residue from ethyl acetate-n-hexane gave 0.480 g. of the desired product, melting at 189° C. Yield: 92.3% (on the theoretical amount).

*Analysis.*—Calculated for $C_{22}H_{34}O_4$: C, 72.89; H, 9.45. Found: C, 72.81; H, 9.41.

EXAMPLE 3

Preparation of 6β-methoxy-17β-hydroxy-3α,5-cyclo-5α-estrane 10β-carboxylic acid 17-phenylpropionate A solution of 1.00 g. of 6β-methoxy-17β, 19-dihydroxy-3α,5-cyclo-5α-androstane 17-phenylpropionate in 100 ml. of purified acetone was cooled to −5° C. and 2 ml. of the Jones reagent added dropwise thereto with stirring under nitrogen atmosphere. Stirring was continued for additional 3 hours under the same condition as set forth above. After completion of the reaction, the excess reagent was decomposed by addition of isopropanol, the reaction mixture made alkaline by addition of 3% aqueous sodium bicarbonate and concentrated under reduced pressure. The concentrate thus obtained was made acidic with acetic acid and the acidic mixture extracted several times with methylene chloride. The combined extracts were washed with water and dried over anhydrous sodium sulfate. After removal of the solvent by distillation under reduced pressure, recrystallization of the crystalline residue from isopropylether gave 0.917 g. of the desired product, melting at 138–139° C. Yield: 89% (on the theoretical amount).

*Analysis.*—Calculated for $C_{29}H_{38}O_5$: C, 74.65; H, 8.21. Found: C, 74.23; H, 7.95.

EXAMPLE 4

Preparation of 6β-methoxy-17α-ethynyl-17β-hydroxy-3α,5-cyclo-5α-estrane 10β-carboxylic acid A solution of 1.00 g. of 6β-methoxy-17α-ethynyl-17β, 19-dihydroxy-3α,5-cyclo-5α-androstane in 120 ml. of purified acetone was cooled to −10° C. and 3 ml. of the Jones reagent added dropwise thereto over 10 minutes with stirring. Then, the mixture was stirred under the same condition as set forth above for additional 4 hours. Thereafter, the excess reagent was decomposed by addition of 2 ml. of isopropanol and about 10 ml. of a saturated sodium bicarbonate solution in water was added to the mixture. The alkaline mixture was concentrated under reduced pressure at 50° C. (bath temperature). The concentrate thus obtained was made acidic by addition of glacial acetic acid and extracted several times with ethyl acetate. The combined extracts were washed with water, dried over anhydrous sodium sulfate and then the ethyl acetate was distilled off under reduced pressure to yield 0.80 g. of an oily residue. The residue thus obtained was chromatographed through a column of silica-gel (30 g.). From the benzene-ether (4:1) eluates there was obtained the desired product as non-crystalline substances.

EXAMPLE 5

Preparation of 6β-methoxy-3α,5-cyclo-19-nor-5α-cholestane 10β-carboxylic acid

To a solution of 1.00 g. of 6β-methoxy-19-hydroxy-3α,5-cyclo-5α-cholestane in 100 ml. of acetone was added dropwise at −5° C. under nitrogen atmosphere 1.8 ml. of the Jones reagent with stirring. Stirring was continued under the same condition as set forth above for additional 4 hours. After completion of the reaction, the excess reagent was decomposed by addition of isopropanol, the resulting mixture made alkaline with 2% aqueous sodium hydroxide and then concentrated below 40° C. under reduced pressure. Subsequently, the concentrate thus obtained was made acidic with acetic acid and the acidic mixture extracted several times with ethyl acetate. The combined extracts were washed with water and dried over anhydrous sodium sulfate. Removal of the solvent by distillation under reduced pressure followed by recrystallization of the residue from methanol gave 0.916 g. of the desired product, melting at 112–113° C. Yield: 88.6% (on the theoretical amount).

*Analysis.* — Calculated for $C_{28}H_{46}O_3$: C, 78.09; H, 10.77. Found: C, 77.93; H, 10.67.

EXAMPLE 6

Preparation of 6β-methoxy-17α-methyl-17β-hydroxy-3α,5-cyclo-5α-estrane 10β-carboxylic acid To a solution of 1.00 g. of 6β-methoxy-17α-methyl-17β, 19-dihydroxy-3α,5-cyclo-5α-androstane in 100 ml. of acetone was added dropwise at −5° C. 2.3 ml. of the Jones reagent under nitrogen atmosphere with stirring. Stirring was continued under the same condition as set forth above for additional 5 hours. After completion of the reaction, the excess reagent was decomposed by addition of isopropanol, the mixture made alkaline with 3% aqueous sodium bicarbonate and then the acidic mixture concentrated below 40° C. under reduced pressure. Subsequently, the concentrate was made acidic with acetic acid and the resulting mixture extracted several times with ethyl acetate. The combined extracts were washed with water and dried over anhydrous sodium sulfate. Removal of the solvent by distillation under reduced pressure followed by recrystallization of the residue from ethyl acetate gave 0.927 g. of the desired product, melting at 223–224° C. Yield: 89% (on the theoretical amount).

*Analysis.*—Calculated for $C_{21}H_{32}O_4$: C, 72.38; H, 9.26. Found C, 72.31; H, 9.21.

EXAMPLE 7

Preparation of 6β-methoxy-17α-ethynyl-17β-hydroxy-3α,5-cyclo-5α-estrane 10β-carboxylic acid 17-acetate To a solution of 0.185 g. of 6β-methoxy-17α-ethynyl-17β, 19-dihydroxy-3α,5-cyclo-5α-androstane 17-acetate in 25 ml. of purified acetone was added dropwise at −10° C. 0.30 ml. of the Jones reagent under dry nitrogen atmosphere and with stirring. The resulting mixture was stirred at that temperature for 3 hours and 0.10 ml. of additional Jones reagent added thereto. Then the mixture was stirred at −3° to −6° C. for additional 3 hours. The excess oxidizing agent was decomposed by addition of 0.5 ml. of isopropanol before addition of water to the reaction mixture, and then the whole mixture extracted several times with ether. The combined extracts were washed with water, dried and concentrated to dryness, thereby leaving 0.22 g. of crystalline residue. The residue so obtained was recrystallized from benzene-n-hexane to give 0.17 g. of the desired product as needles melting at 222–227° C. Yield 88% (on the theoretical amount).

*Analysis.*—Calculated for $C_{24}H_{32}O_5$: C, 71.97; H, 8.05. Found: C, 71.94; H, 8.11.

EXAMPLE 9

Preparation of 6β-methoxy-17β-hydroxy-3α,5-cyclo-5α-estrane 10β-carboxylic acid 17-adamantoate To a solution of 0.50 g. of 6β-methoxy-17β, 19-dihydroxy-3α,5-cyclo-5α-androstane 17-adamantoate in 50 ml. of acetone was added dropwise with stirring 1.0 ml. of the Jones reagent under ice-cooling and nitrogen atmosphere. The resulting mixture was stirred under ice-cooling for 5 hours and then treated in the same manner as in Example 7 to yield 0.55 g. of crystalline substance, which was then recrystallized from benzene-n-hexane to give 0.40 g. of the desired product as thin plates melting at 220–230° C. Upon further recrystallization from benzene-n-hexane, it melts at 228–231° C.

*Analysis.*—Calculated for $C_{31}H_{44}O_5$: C, 74.96; H, 8.93. Found: C, 74.82; H, 8.92.

What is claimed is:

1. A 6β-alkoxy-10β-carboxyl - 3α,5 - cyclosteroid compound of the formula

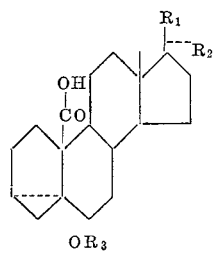

wherein $R_1$ is selected from the group consisting of hyaroxy, hydrocarbon, acyloxy, —$C_8H_{17}$ and —$COCH_3$;

$R_2$ is selected from the group consisting of hydrogen, lower alkyl, lower alkenyl and lower alkynyl;

$R_1$ and $R_2$, when taken together to the carbon atom to which they are attached, represent keto group and $R_3$ represents lower alkyl.

2. 6β-methoxy-3α,5-cyclo-5α-estran-17-one 10β-carboxylic acid.

3. 6β - methoxy-17α-methyl-17β-hydroxy-3α,5-cyclo-5α-estrane 10β-carboxylic acid.

4. 6β-methoxy-17α-ethyl - 17β - hydroxy-3α,5-cyclo-5α-estrane 10β-carboxylic acid.

5. 6β-methoxy-17α-ethynyl-17β-hydroxy-3α,5-cyclo-5α-estrane 10β-carboxylic acid.

6. 6β-methoxy-17α-ethynyl-17β-hydroxy-3α,5-cyclo-5α-estrane 10β-carboxylic acid, 17-acetate.

7. 6β-methoxy-17β-hydroxy-3α,5-cyclo-5α-estrane 10β-carboxylic acid 17-phenylpropionate.

8. 6β-methoxy-17β-hydroxy-3α,5-cyclo-5α-estrane 10β-carboxylic acid 17-adamantoate.

9. 6β-methoxy-3α,5-cyclo-19-nor-5α-cholestane 10β-carboxylic acid.

References Cited

UNITED STATES PATENTS 3,371,088   2/1968   Tanabe et al. _____ 260—239.55

OTHER REFERENCES

Tanabe et al.: Chem. Pharm. Bull. (Japan) 10, 1126 and 1127 (1962).

LEWIS GOTTS, Primary Examiner

E. G. LOVE, Assistant Examiner

U.S. Cl. X.R.

260—239.55, 397.5, 397.2, 397.4, 999